United States Patent [19]

Blount

[11] 4,069,391

[45] Jan. 17, 1978

[54] PROCESS FOR THE PRODUCTION OF POLY(ALLYL SILICOFURMATE)

[76] Inventor: David H. Blount, 5450 Lea St., San Diego, Calif. 92105

[21] Appl. No.: 757,239

[22] Filed: Jan. 6, 1977

Related U.S. Application Data

[60] Division of Ser. No. 622,525, Oct. 15, 1975, Pat. No. 4,020,259, which is a continuation-in-part of Ser. No. 551,534, Feb. 21, 1975, Pat. No. 3,956,466, which is a continuation-in-part of Ser. No. 71,628, Sept. 11, 1970, abandoned.

[51] Int. Cl.² .................. C08F 14/02; C08F 14/16; C08F 114/14; C08F 30/08

[52] U.S. Cl. .................. 526/17; 260/448.8 R; 526/29; 526/47; 526/279

[58] Field of Search .................. 526/17, 29, 47, 279; 260/448.8 R

[56] References Cited

U.S. PATENT DOCUMENTS

| 3,203,919 | 8/1965 | Brachman | 526/279 |
| 3,369,006 | 2/1968 | Brown | 526/279 |
| 3,959,242 | 5/1976 | Watts et al. | 526/29 |

Primary Examiner—Herbert J. Lilling

[57] ABSTRACT

Allyl halides are polymerized by a catalyst, silicic or silicoformic acids, to produce poly(allyl halide) polymer and poly(allyl alcohol) polymer.

5 Claims, No Drawings

PROCESS FOR THE PRODUCTION OF POLY(ALLYL SILICOFURMATE)

CROSS-REFERENCE TO RELATED APPLICATIONS

This application is a division of U.S. Patent application Ser. No. 622,525, filed Oct. 15, 1975, and now U.S. Pat. No. 4,020,259 which application is a continuation-in-part of my copending U.S. Patent application, Ser. No. 551,534 and now U.S. Pat. No. 3,956,466, filed Feb. 21, 1975, which is a continuation-in-part of my earlier U.S. Patent application, Ser. No. 71,628, filed Sept. 11, 1970, now abandoned.

BACKGROUND OF THE INVENTION

This invention relates in general to the process for the polymerization of allyl halides by using silicic acids, silicoformic acid, or a combination of silicic acid and silicoformic acid as the catalyst and, more specifically, to a process for producing novel poly(allyl chloride) polymer, poly(allyl alcohol) polymer and poly(allyl silicoformate) polymer.

Silicoformic acid may be produced by the chemical reaction of a dry, granular alkali metal metasilicate or an alkaline earth metal metasilicate with a mineral acid or a hydrogen salt. The silicoformic acid is washed with water to remove the salt, then filtered and air dried into a fine white granular compound. Silicoformic acid, also known as monosilanic acid, has the general formula $H.SiO.OH$. It can also be produced by other methods, such as those disclosed in U.S. Pat. No. 3,674,430.

The metasilicic acid, orthosilicic acid and gelatinous silicic acid may be produced by any of the commonly known methods, such as treating an aqueous solution of sodium silicate with an acid to produce a gelatinous silicic acid or treating clay with sulfuric acid to produce metasilicic acid.

Allyl halides may be produced by the addition of a halide to propylene. Methallyl chloride may be produced by the addition of a halide to isobutylene. Other compounds with the combination C=C—C, which is known as the allylic system, may be used. Allyl chloride is the preferred allyl halide. Other allyl halides such as allyl bromide and methallyl chloride may be used in this process.

Poly(allyl halide) polymer, poly (allyl alcohol) polymer and poly(allyl silicoformate) polymer may be used as coating agents, adhesives, impregnants, molding powders, paints, varnishes, laminates, fillers, in dispersions and as an intermediate in resin production.

Poly(allyl halide) polymer and poly(allyl alcohol) polymer will chemically react with silicoformic acid by heating the mixture in the presence of an alkali catalyst to produce poly(allyl silicoformate) polymer

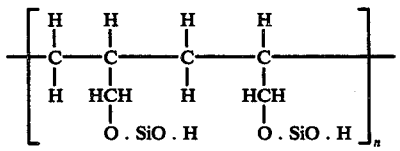

Poly(allyl silicoformate) polymer may also be produced by adding an alkali hydroxide to the allyl chloride and silicoformic acid mixture.

Poly(allyl alcohol) polymer may be chemically reacted with a dicarboxyl acid or an anhydride to produce a polyester resin. Poly(allyl alcohol) polymer may be chemically reacted with a diisocyanate to produce a polyurethane resin or foam.

By using this process, allyl chloride may be copolymerized with other polymerable organic compounds by using an acetic or basic catalyst. Allyl chloride, when mixed with silicic acid or silicoformic acid, will polymerize in a wide range of pH, from a pH of 2 to 11; therefore both basic and acetic catalysts may be used with silicic acid or silicoformic acid to copolymerize allyl chloride with other polymerable organic compounds. Acrylic acid may be copolymerized with allyl chloride and silicoformic acid with an alkali catalyst to produce a clear poly(allyl chloride acrylic silicoformate) polymer which is soluble in dilute alkali aqueous solutions.

Allyl chloride may be copolymerized with polymerable organic compounds by adding an alkali aqueous solution and a peroxide to the silicic or silicoformic acid. A redox system may be used for the copolymerization by adding silicic or silicoformic acid as the catalyst for allyl chloride. Allyl chloride may be copolymerized with vinyl chloride, vinyl acetate, acrylonitrile, acrylic acid, methacrylic acid, methyl acrylate, methyl methacrylate, vinylidene chloride, isoprene, chloroprene, butadiene, styrene, methyl styrene and other polymerable organic compounds.

Poly(allyl chloride) polymer may be chemically reacted with an alkali hydroxide or carbonate in an aqueous or alcoholic solution to produce a poly(allyl alcohol) polymer

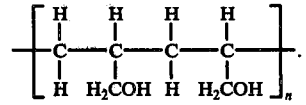

Poly(allyl alcohol) polymer is produced when allyl chloride is mixed with silicic acid or silicoformic acid, water and an alkali. The chemical reaction proceeds rapidly at ambient temperature and pressure. About 80–90% of the allyl chloride is polymerized in about one hour. The poly(allyl alcohol) polymer will form an emulsion with water and then gradually separates out as a cream colored, soft, sticky polymer.

While the specific reactions to produce poly(allyl alcohol) polymer are not fully understood, typical reactions which are believed to occur take place as follows:

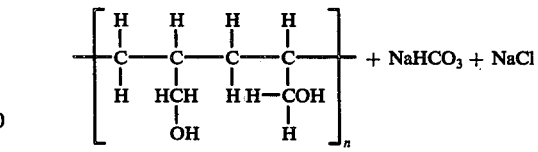

There is also a mixture of poly(allyl chloride) polymer and poly (allyl alcohol) polymer present; not all of the poly(allyl chloride) polymer is converted to poly(allyl alcohol) polymer. There is also a small percent of poly(allyl silicoformate) polymer produced when silicoformic acid is used as the catalyst.

Allyl chloride will also copolymerize with other allyl compounds such as allyl alcohol, methallyl chloride and allyl bromide by using a silicon acid catalyst.

DETAILED DESCRIPTION OF THE INVENTION

Any suitable allyl halide compound with the combination C=C—C, known as the allylic system, may be used in my novel process. Typical allyl halide compounds are allyl chloride, methallyl chloride and allyl bromide.

Any suitable silicic acid, silicoformic acid or combinations of silicic acids, silicoformic acid and silicon dioxide may be used as the catalyst in this invention. The catalytic mechanism which takes place is not fully understood. The silicic acid and silicoformic acid may react slightly with one of the primary reactants. When an alkali compound is added to the silicic acid and silicoformic acid and heated, it will react with the primary reactant. The amount of silicic acid or silicoformic acid needed to catalyze the reaction may vary greatly, from 1% to 50% by weight. The preferred concentration is 1 part silicon acid to 2 parts allyl halide by weight to initiate the polymerization, then more allyl halide may be gradually added, and the polymerization continues.

The poly(allyl chloride) polymer produced by my novel process may be chemically reacted with alkali compounds to produce a mixture of poly(allyl chloride) and poly(allyl alcohol) polymer. The poly(allyl chloride) polymer may be reacted with silicoformic acid by using a suitable alkali catalyst and heat to produce a tan soft solid poly(allyl silicoformate) polymer.

The poly(allyl alcohol) polymer produced by my novel process may be chemically reacted with carboxylic acids and dicarboxylic acids to produce new condensation resins.

DESCRIPTION OF PREFERRED EMBODIMENTS

The following examples describe in detail certain preferred embodiments of the process of my invention. These preferred processes may, of course, be varied as described with similar results. Parts and percentages are by weight unless otherwise indicated.

EXAMPLE I

About 3 parts by weight of sodium metasilicate pentahydrate are slowly added to about 2 parts by weight of concentrated sulfuric acid while agitating and keeping the temperature below 100° C. Oxygen is given off and considerable heat is produced. The chemical reaction is complete in 2-6 hours, thereby producing silicoformic acid and sodium sulfate. The silicoformic acid (H.SiO.OH) is washed with water and filtered to remove the sodium sulfate, then air dried into a white granular compound.

About 1 part by weight of fine granular silicoformic acid and about 2 parts by weight of allyl chloride are mixed together and agitated for about 20 to 40 minutes at a temperature of between 0° to 45° C and ambient pressure, thereby producing a thick, light, yellow liquid, poly(allyl chloride) polymer. The polymer becomes a soft solid polymer in 6 to 12 hours.

About 4 parts by weight of allyl chloride are added to the mixture of silicoformic acid and poly(allyl chloride) polymer. The polymer goes into solution and is filtered off. The solution is then heated to above the boiling point of allyl chloride to remove the solvent, thereby recovering poly(allyl chloride) polymer. The allyl chloride which is evaporated may be recycled through the silicoformic acid.

EXAMPLE II

Dilute sulfuric acid is added to a solution of sodium silicate (water glass) until the pH is 6 to 7, thereby producing gelatinous silicic acid. The water and salt are filtered off; the gelatinous silicic acid is then rewashed with water, filtered and air dried at 60° to 100° C.

About one part by weight of dried, granular, gelatinous silicic acid and about one part by weight of allyl chloride are mixed then agitated at ambient temperature and pressure for 15 to 40 minutes. About one part allyl chloride is added to the mixture and agitated for 15 to 20 minutes, then another one part by weight of allyl chloride is added to the said mixture, mixed and agitated for 30 to 40 minutes, thereby producing a thick, light yellow polymer, poly(allyl chloride) polymer. The mixture becomes a soft, solid mass in 6 to 12 hours. About 5 parts by weight of water are added to the mixture and agitated, thereby separating the poly(allyl chloride) polymer from the silicic acid. The water and polymer are filtered off the silicic acid. The polymer separates from the water, and the water is filtered off, thereby recovering the poly(allyl chloride) polymer.

EXAMPLE III

Allyl chloride is continously passed through a column of silicoformic acid granules at a slow rate which requires about 30 to 90 minutes for a given amount to pass through this column. About 60 to 80% of the allyl chloride that passes through the column of silicoformic acid is polymerized and the unpolymerized allyl chloride acts as the solvent, thereby removing the poly(allyl chloride) polymer from the column of silicoformic acid into another suitable vessel. The allyl chloride is evaporated by heating the solution to above the boiling point of allyl chloride, thereby recovering poly(allyl chloride) polymer, a thick, light yellow, liquid. The allyl chloride monomer is then recycled through the column of silicoformic acid.

EXAMPLE IV

About 2 parts by weight of allyl chloride are mixed with about one part of a catalyst containing about equal parts of silicoformic acid, orthosilicic acid and metasilicic acid. The mixture is agitated and heated to about 35° to 100° C in a closed system at ambient pressure for about 15 to 30 minutes, thereby polymerizing the allyl chloride and producing poly(allyl chloride) polymer. The poly(allyl chloride) polymer is removed from the catalyst with a solvent such as acetone. The poly(allyl chloride) polymer is recovered by evaporating the acetone.

EXAMPLE V

About 2 parts by weight of allyl chloride are mixed with about 1 part by weight of granular silicoformic acid. The mixture is agitated for 15 to 30 minutes at ambient temperature and pressure. Additional 10 parts by weight of allyl chloride are added in proportions of 2 parts as described above, thereby producing a thick liquid, poly(allyl chloride) polymer, which after 6 to 12 hours becomes a soft, solid polymer. The polymer is recovered by mixing the mixture with a solvent, methylene chloride and filtered from the silicoformic acid.

The solvent is evaporated, thereby recovering poly(allyl chloride) polymer. This process may be carried out at a temperature between 0° and 100° C.

EXAMPLE VI

About 20 parts by weight of gelatinous othosilicic acid containing about 40 parts by weight of water are mixed with about 20 parts by weight of granular sodium carbonate and about 20 parts by weight of sodium hydroxide flakes. About 40 parts by weight of allyl chloride are added to the said mixture, agitated at ambient temperature and pressure for 20 to 40 minutes, thereby producing a thick, cream colored polymer, poly(allyl alcohol) polymer.

The poly(allyl alcohol) polymer continues to polymerize and becomes a soft solid polymer in 6 to 12 hours. About 100 parts by weight of water are added to the mixture and agitated for about 5 to 10 minutes. The poly(allyl alcohol) polymer emulsifies and is filtered from the silicic acid. Upon sitting for a few minutes, the poly(allyl alcohol) polymer separates from the water and is recovered by removing the water.

EXAMPLE VII

About 10 parts by weight of allyl chloride, about 5 parts by weight of silicoformic acid and about 5 parts by weight of sodium hydroxide flakes are mixed, then agitated at 30° to 40° C and ambient pressure for 20 to 40 minutes. About 50 parts by weight of water is added to said mixture and mixed. A thick, tan colored liquid polymer floats to the top and is removed, thereby recovering poly(allyl silicoformate) polymer.

EXAMPLE VIII

About 10 parts by weight of allyl chloride and about 5 parts by weight of silicoformic acid are mixed, then agitated for 20 to 40 minutes, thereby producing a thick, light yellow liquid polymer, poly(allyl chloride). About 8 parts by weight of sodium carbonate are mixed with the silicoformic acid and poly(allyl chloride) mixture, then heated to 40° to 80° C at ambient pressure for 20 to 40 minutes, thereby producing a tan, solid polymer, poly(allyl silicoformate) polymer. The salt and sodium hydrogen carbonate are removed by washing and filtering.

EXAMPLE IX

About 10 parts by weight of allyl chloride, about 10 parts allyl alcohol, about 5 parts by weight of potassium carbonate, about 10 parts silicoformic acid and about 10 parts by weight of water are mixed then agitated at ambient temperature and pressure for 30 to 60 minutes, thereby producing a cream colored, thick, liquid copolymer, poly(allyl chloride allyl alcohol). The copolymer becomes a soft, solid polymer after 6 to 12 hours. The copolymer is separated from the catalyst, silicoformic acid, by adding 100 parts by weight of water. The copolymer floats to the top and is removed from the water, thereby recovering poly(allyl chloride allyl alcohol) copolymer.

EXAMPLE X

About 20 parts by weight of allyl chloride, about 10 parts by weight of granular orthosilicic acid, about 5 parts by weight of sodium carbonate are mixed, then agitated for 20 to 50 minutes at ambient temperature and pressure, thereby producing a cream colored, thick, liquid copolymer, poly(allyl chloride allyl alcohol). The copolymer is extracted from the silicic acid by a solvent, allyl chloride monomer.

Although specific materials and conditions were set forth in the above Examples, these were merely illustrative of preferred embodiments of my invention. Various other compositions, such as the typical materials listed above may be used, where suitable. The reactive mixture and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:
1. The process for the production of poly(allyl silicoformate) by the following steps:
   a. providing a quantity of silicon acid;
   b. mixing 1 part by weight of granular silicon acid with 2 parts by weight of an allyl halide;
   c. agitating said mixture in a closed system and keeping the temperature between 0° to 100° C for about 20 to 40 minutes at ambient pressure; thereby
   d. producing poly(allyl halide) polymer;
   e. adding 1 part by weight of sodium carbonate to the mixture of silicon acid and poly(allyl halide) polymer;
   f. heating said mixture to 60° to 80° C while agitating for 20 to 40 minutes under ambient pressure, thereby
   g. producing poly(allyl silicoformate) polymer and salt;
   h. washing said mixture with water;
   i. filtering off the salt and water, thereby
   j. recovering poly(allyl silicoformate) polymer.
2. The method of claim 1 wherein the alkali metal metasilicate is sodium metasilicate.
3. The method of claim 1 wherein the silicon acid may be produced by the following steps:
   a. adding about 3 parts by weight of a dry granular alkali metal metasilicate slowly to 2 parts by weight of concentrated sulfuric acid;
   b. agitating said mixture to keep the temperature below 100° C and oxygen evolves from the mixtures thereby
   c. producing a white granular mixture of a silicon acid and alkali metal sulfate;
   d. washing said mixture with water, then filtering the mixture to remove the alkali metal sulfate and then leaving a white granular silicon acid (silicoformic acid).
4. The method of claim 1 wherein the allyl halide is selected from the group consisting of allyl chloride and allyl bromide.
5. The product produced by the method of claim 1.

* * * * *